United States Patent
Qiu et al.

(10) Patent No.: US 12,000,317 B2
(45) Date of Patent: Jun. 4, 2024

(54) TEMPERATURE REGULATING VALVE AND THERMAL MANAGEMENT SYSTEM PROVIDED WITH TEMPERATURE REGULATING VALVE

(71) Applicant: Zhejiang Sanhua Automotive Components Co., Ltd., Hangzhou (CN)

(72) Inventors: Haoming Qiu, Zhejiang (CN); Xiaojun Qian, Zhejiang (CN); Xiaodan Lv, Zhejiang (CN); Haibo Chen, Zhejiang (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 673 days.

(21) Appl. No.: 17/040,810

(22) PCT Filed: Apr. 23, 2019

(86) PCT No.: PCT/CN2019/083821
§ 371 (c)(1),
(2) Date: Sep. 23, 2020

(87) PCT Pub. No.: WO2019/206118
PCT Pub. Date: Oct. 31, 2019

(65) Prior Publication Data
US 2021/0054769 A1    Feb. 25, 2021

(30) Foreign Application Priority Data

Apr. 27, 2018  (CN) .......................... 201810391922.8
Apr. 27, 2018  (CN) .......................... 201810396235.5
(Continued)

(51) Int. Cl.
*F01M 5/00*    (2006.01)
*F16H 57/04*   (2010.01)
(Continued)

(52) U.S. Cl.
CPC .......... *F01M 5/007* (2013.01); *F16H 57/0413* (2013.01); *F16K 11/044* (2013.01); *F16K 31/002* (2013.01); *G05D 23/02* (2013.01)

(58) Field of Classification Search
CPC ... F01M 5/007; F16H 57/0413; F16K 11/044; G05D 23/02
(Continued)

(56) References Cited

U.S. PATENT DOCUMENTS

| | | |
|---|---|---|
| 4,488,680 A | 12/1984 | Itoh |
| 5,564,317 A | 10/1996 | Gilroy et al. |

(Continued)

FOREIGN PATENT DOCUMENTS

| | | |
|---|---|---|
| CN | 2641395 Y | 9/2004 |
| CN | 102359576 A | 2/2012 |

(Continued)

OTHER PUBLICATIONS

Extended European Search Report for European Application No. 19792894.8, dated Nov. 23, 2021.

(Continued)

*Primary Examiner* — Lindsay M Low
*Assistant Examiner* — Omar Morales
(74) *Attorney, Agent, or Firm* — Wolf, Greenfield & Sacks, P.C.

(57) ABSTRACT

A temperature regulating valve and a thermal management system provided with the temperature regulating valve are provided. The temperature regulating valve includes a filling state and a first working state, and a thermodynamic element is impelled to not abut against a first valve seat by means of providing a hot melt in an end cover of the temperature regulating valve. When a first valve port is in an open state, at said time the temperature regulating valve is installed in the thermal management system, and since the first valve (Continued)

port is in the open state, lubricating oil may then flow into a heat exchange device by means of a first interface channel, the first valve port, and a second interface channel during a process of filling the lubricating oil.

17 Claims, 8 Drawing Sheets

(30) Foreign Application Priority Data

Apr. 27, 2018 (CN) .......................... 201810396358.9
Apr. 27, 2018 (CN) .......................... 201810396377.1

(51) Int. Cl.
*F16K 11/044* (2006.01)
*F16K 31/00* (2006.01)
*G05D 23/02* (2006.01)

(58) Field of Classification Search
USPC ....................................................... 236/93 R
See application file for complete search history.

(56) References Cited

U.S. PATENT DOCUMENTS

| | | | |
|---|---|---|---|
| 2006/0108435 A1 | 5/2006 | Kozdras et al. | |
| 2007/0267450 A1* | 11/2007 | Bolyard, Jr. | B05B 1/306 222/504 |
| 2009/0272441 A1 | 11/2009 | Sasaki et al. | |
| 2010/0126594 A1* | 5/2010 | Sheppard | F01P 7/16 137/340 |
| 2012/0055565 A1 | 3/2012 | Kanzaka et al. | |
| 2013/0042927 A1 | 2/2013 | Neelakantan et al. | |
| 2015/0185738 A1 | 7/2015 | Qiu et al. | |
| 2020/0300354 A1 | 9/2020 | Qiu et al. | |

FOREIGN PATENT DOCUMENTS

| | | | |
|---|---|---|---|
| CN | 102954198 A | 3/2013 | |
| CN | 103573598 A | 2/2014 | |
| CN | 103573991 A | 2/2014 | |
| CN | 103573993 A | 2/2014 | |
| CN | 103867692 A | 6/2014 | |
| CN | 104344063 A | 2/2015 | |
| CN | 205036847 U | 2/2016 | |
| CN | 104822975 B | 12/2017 | |
| CN | 107448641 A | 12/2017 | |
| JP | 2002-039339 A | 2/2002 | |
| JP | 2009-275861 A | 11/2009 | |
| JP | 2011-007321 A | 1/2011 | |
| WO | WO 2007/144746 A2 | 12/2007 | |
| WO | WO 2010/137214 A2 | 12/2010 | |
| WO | WO-2018098574 A1 * | 6/2018 | ............... F01M 1/16 |

OTHER PUBLICATIONS

First Office Action for Japanese Application No. 2020-554861, dated Nov. 22, 2021.
International Search Report and Written Opinion for International Application No. PCT/CN2019/083821, dated Jul. 2, 2019.
Chinese Office Action dated Mar. 16, 2020 in connection with Chinese Application No. 201810396377.1, and English translation thereof.
PCT/CN2019/083821, Jul. 2, 2019, International Search Report and Written Opinion.

* cited by examiner

TEMPERATURE REGULATING VALVE AND THERMAL MANAGEMENT SYSTEM PROVIDED WITH TEMPERATURE REGULATING VALVE

The present application is a national stage entry under 35 U.S.C. § 371 of International Patent Application Serial No. PCT/CN2019/083821, filed on Apr. 23, 2019, which claims the benefit of priorities to the following four Chinese patent applications:

1) Chinese Patent Application No. 201810396377.1, titled "TEMPERATURE REGULATING VALVE AND THERMAL MANAGEMENT SYSTEM PROVIDED WITH TEMPERATURE REGULATING VALVE", filed on Apr. 27, 2018 with the China National Intellectual Property Administration;
2) Chinese Patent Application No. 201810396358.9, titled "TEMPERATURE REGULATING VALVE AND THERMAL MANAGEMENT SYSTEM PROVIDED WITH TEMPERATURE REGULATING VALVE", filed on Apr. 27, 2018 with the China National Intellectual Property Administration;
3) Chinese Patent Application No. 201810396235.5, titled "TEMPERATURE REGULATING VALVE AND THERMAL MANAGEMENT SYSTEM PROVIDED WITH TEMPERATURE REGULATING VALVE", filed on Apr. 27, 2018 with the China National Intellectual Property Administration; and
4) Chinese Patent Application No. 201810391922.8, titled "TEMPERATURE REGULATING VALVE AND THERMAL MANAGEMENT SYSTEM PROVIDED WITH TEMPERATURE REGULATING VALVE", filed on Apr. 27, 2018 with the China National Intellectual Property Administration, which are incorporated herein by reference in their entireties.

FIELD

The present application relates to the field of fluid control, and in particular to a thermostatic valve and a thermal management system having the thermostatic valve.

BACKGROUND

During running of a vehicle, various components need to be lubricated timely by lubricating oil to ensure the normal running of the vehicle, including the gearbox oil. The function of adjusting the temperature of the gearbox oil is mainly achieved by the thermal management system. When the temperature of the gearbox oil line increases, the heat-sensitive material of a thermally movable element in the thermostatic valve expands when being heated, the passage for the gearbox oil in the thermostatic valve to directly flow back to the gearbox is blocked, or the flow rate of the passage decreases, at this time, the high temperature oil enters the heat exchange device for cooling through the thermostatic valve and then flows back to the gearbox. Conversely, when the oil temperature is too low, the heat-sensitive material of the thermally movable element begins to solidify and contract, a push rod is reset and the passage for the gearbox oil to directly flow back to the gearbox is open.

Therefore, the passage for communicating the heat exchange device in the thermostatic valve is open in the high temperature state, if the temperature of the lubricating oil is lower than the set temperature, the passage is in the closed state. When the lubricating oil is filled into the thermal management system, in order to fill some lubricating oil into the heat exchange device, the high temperature lubricating oil needs to be filled so that some lubricating oil can be filled into the heat exchange device. Therefore, the current gearbox oil filling procedure is relatively complicated. If the temperature of the filled lubricating oil is not high enough, the lubricating oil cannot be filled into the heat exchange device, which may cause insufficient lubricating oil in the thermal management system. For example, in the normal use process, some lubricating oil will stay in the heat exchange device and the connecting pipeline, which may cause insufficient lubricating oil in the gearbox.

SUMMARY

In order to solve the above problem, the technical solution of the present application is to provide a thermostatic valve, which includes a main valve body, an end cap, a thermally movable element and a first spring. The main valve body is provided with a first connecting port portion, a second connecting port portion and a third connecting port portion. The first connecting port portion is provided with a first connecting port passage, the second connecting port portion is provided with a second connecting port passage, and the third connecting port portion is provided with a third connecting port passage. One end of the thermally movable element directly or indirectly abuts against the end cap, and the other end of the thermally movable element directly or indirectly abuts against the first spring. The first spring is in a compressed state. The thermostatic valve is further provided with a first valve seat and a second valve seat. The first valve seat is provided with a first valve port, the second valve seat is provided with a second valve port. The first valve port is located between the first connecting port passage and the second connecting port passage, and the second valve port is located between the first connecting port passage and the third connecting port passage.

The thermostatic valve has a first cavity which is located in the end cap. The thermally movable element includes a valve rod. An end of the valve rod inserts into the end cap. A hot melt is provided in the first cavity, which is located in an area between the valve rod and a bottom wall corresponding to the first cavity.

The thermostatic valve includes a filling state and a first working state. In the filling state, the end of the valve rod maintains a certain distance from the bottom wall corresponding to the first cavity through the hot melt, the first valve port is open, the second valve port is closed, or open by a small degree. In the first working state, the first valve port is open, the second valve port is closed. A distance between the end of the valve rod and the bottom corresponding to the first cavity in the first working state is less than the distance between the end of the valve rod and the bottom corresponding to the first cavity in the filling state.

By providing the hot melt in the end cap of the thermostatic valve, the hot melt is in a solid-state when being filled, and since the hot melt is provided, the thermally movable element does not abut against the first valve seat, and the first valve port is in an open state. At this time, after the thermostatic valve is installed in the thermal management system, since the first valve port is in the open state, in the process of filling the lubricating oil, the lubricating oil can flow into the heat exchange device via the first connecting port passage, the first valve port and the second connecting port passage, the process of filling the lubricating oil in the thermal management system is relatively simple, and the thermal management system can also find whether leakage occurs in the heat exchange device and the connecting pipeline thereof when filling the lubricating oil in time.

BRIEF DESCRIPTION OF THE DRAWINGS

FIG. 11-1 is a schematic partially enlarged view of FIG. 10.

FIG. 11-2 is a schematic sectional view of the assembly formed by the inner housing and the shaft sleeve of the thermostatic valve shown in FIG. 10.

FIG. 13-1 is a schematic partially enlarged view of the thermostatic valve in FIG. 12.

FIG. 13-2 is a schematic sectional view of the assembly formed by the inner housing and the shaft sleeve of the thermostatic valve shown in FIG. 12.

FIG. 15-1 is a schematic partially enlarged view of the thermostatic valve in FIG. 14.

FIG. 15-2 is a schematic sectional view of the assembly formed by the inner housing and the shaft sleeve of the thermostatic valve shown in FIG. 14.

DETAILED DESCRIPTION OF THE EMBODIMENTS

The specific implementation of the present application is described hereinafter in conjunction with the drawings.

Figure 1:
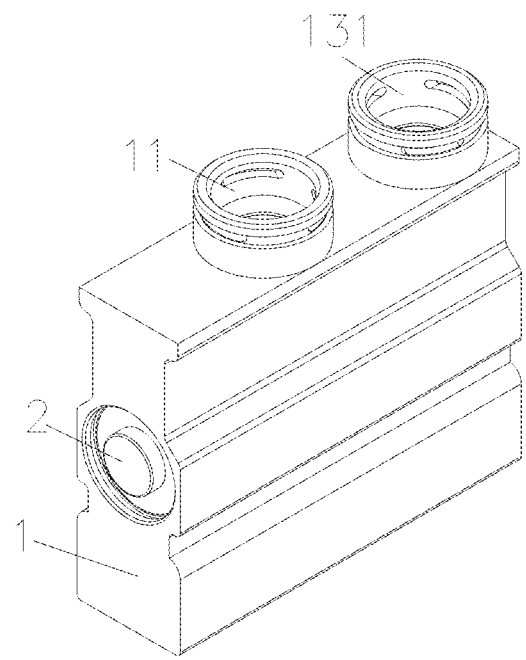
FIG. 1 is a schematic perspective view of a thermostatic valve according to an embodiment of the present application.
Figure 2:
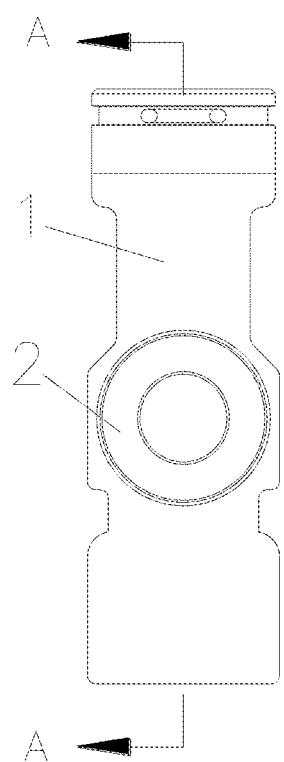
FIG. 2 is a left view of the thermostatic valve in FIG. 1.
Figure 3:
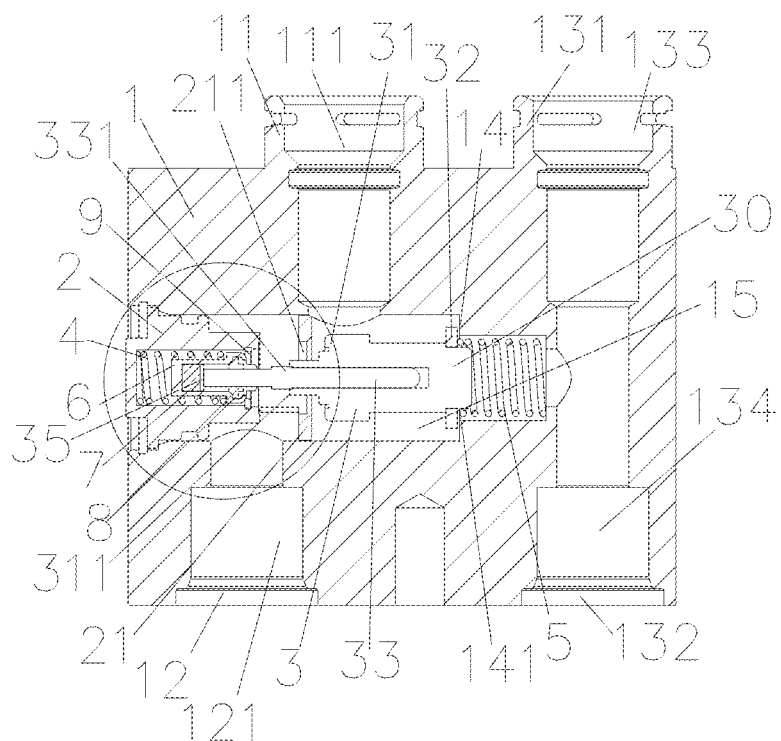
FIG. 3 is a schematic sectional view of the thermostatic valve shown in FIG. 2 taken along line A-A during filling.

As shown in FIGS. 1 to 3, a thermostatic valve includes a main valve body 1, an end cap 2, a thermally movable element 3 accommodated in the main valve body 1, a second spring 4 and a first spring 5. The main valve body 1 is provided with a first connecting port portion 11, a second connecting port portion 12, a third connecting port portion 131 and a fourth connecting port portion 132. The first connecting port portion 11 is provided with a first connecting port passage 111, the second connecting port portion 12 is provided with a second connecting port passage 121, the third connecting port portion 131 is provided with a third connecting port passage 133, and the fourth connecting port portion 132 is provided with a fourth connecting port passage 134. The main valve body 1 is further provided with a valve body accommodating cavity 15, the end cap 2 is fixed to the main valve body 1 and the connection between the end cap 2 and the main valve body 1 is sealed, so that an end of the valve body accommodating cavity 15 is sealed by the end cap 2. The thermally movable element 3 is accommodated into the valve body accommodating cavity 15. One end of the thermally movable element 3 directly or indirectly abuts against the second spring 4, the second spring 4 is in a compressed state, and the other end of the thermally movable element 3 directly or indirectly abuts against the first spring 5, the first spring 5 is in the compressed state. An initial elastic deformation force of the second spring 4 is greater or equal to an elastic deformation force generated by the first spring 5 when the second valve port 141 is closed. It should be pointed out here that, the fourth connecting port portion 132 may also not be provided in other embodiment. In the present embodiment, by providing the fourth connecting port portion 132 in communication with the third connecting port portion 131, a heat exchange device is connected with a gearbox without through a pipeline and a three-way union outside the thermostatic valve. Herein, an indirect abutting refers to that two components abut against each other through one or more objects, and are not in direct contact with each other. For example, in the present embodiment, an end of the valve rod abuts against the end cap through an inner housing and the second spring, which is also referred to as indirect abutting. The main valve body may be an integral structure, or may be formed by installing multiple components, for example, the connecting port portion is a rapid joint and the like by assemble.

The thermostatic valve is further provided with a first valve seat 21 and a second valve seat 14, the first valve seat 21 is provided with a first valve port 211, the second valve seat 14 is provided with a second valve port 141, the first valve port 211 is located between the first connecting port passage 111 and the second connecting port passage 121, the first connecting port passage 111 may be in communication with the second connecting port passage 121 through the first valve port 211, the second valve port 141 is located between the first connecting port passage 111 and the third connecting port passage 121, the first connecting port passage 111 may be in communication with the third connecting port passage 133 through the second valve port 141. In the present embodiment, the first valve seat 21 and the end cap 2 are integrated, that is, the first valve seat 21 is a part of the end cap 2, the second valve seat 14 and the main valve body 1 are integrated, that is, the second valve seat 14 is a part of the main valve body 1, the first valve seat 21 is in interference fit, clearance fit or transition fit with the inner wall corresponding to the valve body accommodating cavity 15. It should be pointed out here that, the first valve seat 21 and/or the second valve seat 14 may also be independent components providing in the main valve body 1. In the present embodiment, the first valve seat 21 and the end cap 2 are integrated, the second valve seat 14 and the main valve body 1 are integrated, thus, not only is the manufacturing process simple, but also the assembly of the parts is also relatively simple.

The thermally movable element 3 includes a body portion 30, a valve rod 33, a first core portion 31 and a second core portion 32. The first core portion 31 and the second core portion 32 are located at two ends of the body portion 30. One end of the valve rod 33 passes through the first core portion 31 and extends out of the body portion 30 and the first core portion 31, and the other end of the valve rod 33 inserts into the body portion 30. An outer diameter of the first core portion 31 is greater than an inner diameter of the first valve port 211, an outer diameter of the second core portion 32 is greater than an inner diameter of the second valve port 141, when the first core portion 31 abuts against the first valve seat 21, the first valve port 211 is closed, and when the second core portion 32 abuts against the second valve seat 14, the second valve port 141 is closed.

In the present embodiment, the thermally movable element 3 further includes a protruding portion 311, the protruding portion 311 is arranged at a side, toward the end cap 2, of the first core portion 31, and the valve rod 3 passes through the protruding portion 311, the outer diameter of the protruding portion 311 is less than the inner diameter of the first valve port 211, the protruding portion 311 may insert into the first valve seat 21. In the present embodiment, the protruding portion 311 inserts into the first valve seat 21, the first valve port 211 is formed between an inner wall corresponding to the first valve port 211 of the first valve seat 21 and the outer wall of the protruding portion 311. It should be noted here that the protruding portion may also not be provided. The stability of the valve rod 33 can be improved by providing the protruding portion 311, and the protruding portion 311 further can have a guiding function.

The valve rod 33 includes a large-diameter portion 331 which is located on a portion of the valve rod 33 where the valve rod 33 extends out of the body portion 30 and the first core portion 31. The outer diameter of the large-diameter portion 331 is greater than the inner diameter of the protruding portion 331 and/or the inner diameter of the first core portion 31. Through the cooperation between the large-diameter portion 331 and the protruding portion 311, the moving distance of the valve rod 33 may be limited to prevent the excessive moving distance of the valve rod 33 from damaging the thermally movable element. In the present embodiment, the large-diameter portion 331 is a part of a portion of the valve rod where the valve rod extends out of the body portion 30 and the first core portion 31, such an arrangement can save the materials of the end cap portion, the valve rod and other portions.

Figure 4:
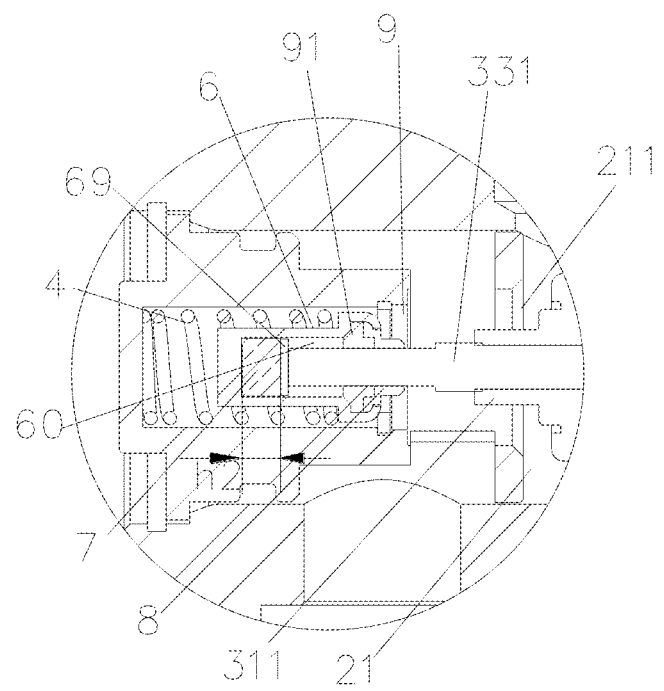
FIG. 4 is a schematic partially enlarged view of the thermostatic valve in FIG. 3.
Figure 5:
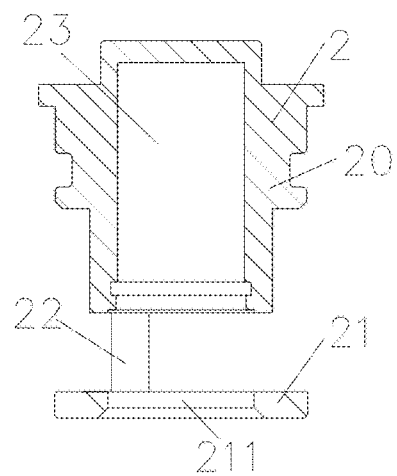
FIG. 5 is a schematic sectional view of an end cap of the thermostatic valve shown in FIG. 3.
Figure 6:
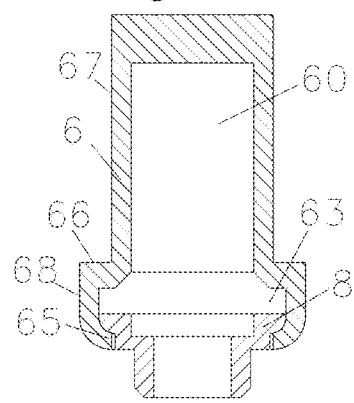
FIG. 6 is a schematic sectional view of an assembly formed by an inner housing and a shaft sleeve of the thermostatic valve shown in FIG. 3.

As shown in FIGS. 4 and 6, the end cap 2 includes a main body portion 20 and the first valve seat 21. The main body portion 20 is provided with an end cap accommodating cavity 23, and an end of the main body portion 20 providing with the end cap accommodating cavity 23 is opened, at least one column portion 22 is provided between the first valve seat 21 and the main body portion 20, one end of the column portion 22 is connected to the first valve seat 21, and the other end of the column portion 22 is connected to the main body portion 20.

In the present embodiment, a connection between the main body portion 20 and the column portion 22 is connected smoothly (that is, the outer wall surface of the connection between the main body portion 20 and the column portion 22 is the same as the outer wall surface of the column portion 22) with the column portion 22, such arrangement is relatively simple to machine. The outer diameter of the connection between the main body portion 20 and the column portion 22 is less than the outer diameter of the first valve seat 21, at least part of the main body portion 20 maintains a certain distance from the inner wall corresponding to the valve body accommodating cavity 15, and the column portion 22 maintains a certain distance from the inner wall corresponding to the valve body accommodating cavity 15, such that the lubricating oil flows to the second connecting port passage 121 after passing through the area.

The end cap accommodating cavity 23 of the end cap 2 is provided with a second spring 4, an inner housing 6 and a shaft sleeve 8. The inner housing 6 is limited in the end cap accommodating cavity 23 by a circlip 9, and one end of the second spring 4 abuts against the bottom wall corresponding to the end cap accommodating cavity 23, and the other end of the second spring 4 abuts against the outer wall of the inner housing 6, and the second spring 4 is in the compressed state.

The inner housing 6 has a first cavity 60, the inner housing 6 is further provided with a position-limiting member 69 which is accommodated in the first cavity 60, the position-limiting member 69 is in clearance fit or is slidably fitted with the inner wall corresponding to the first cavity 60. One end of the valve rod 33 inserts into the first cavity 60 and abuts against the position-limiting member 69, an outer wall of the end portion, inserting into an end of the first cavity 60, of the valve rod 33 maintains a certain distance from the inner wall corresponding to the first cavity 60. It should be noted here that, the position-limiting member 69 may also be integrated with the valve rod or fixed with the valve rod. In the present embodiment, the position-limiting member 69 is in a shape of a disc, and the position-limiting member 69 abuts against the end of the valve rod 33. Such arrangement has a simple structure and is convenient to install. The position-limiting member 69 has the position-limiting and guiding function, which can prevent the valve rod 33 from shifting. In the working state, one end of the position-limiting member 69 can directly or indirectly abut against the bottom corresponding to the first cavity 60. The hot melt 7 hereinafter abuts against the bottom wall corresponding to the first cavity 60, and a part of the hot melt 7 may be limited to an area between the position-limiting member 69 and the bottom wall corresponding to the first cavity 60. After the hot melt 7 melts, the hot melt moves toward the direction corresponding to the cavity with the position-limiting member 69, a part of the hot melt 7 may flow from a gap between the position-limiting member and the inner wall corresponding to the first cavity 60 to the area between the valve rod 33 and the inner wall corresponding to first cavity 60. Certainly, the hot melt 7 may also flow out of the area between the position-limiting member 69 and the bottom corresponding to the first cavity 60 by another way.

In the present embodiment, the inner housing 6 also has a second cavity 63, the inner housing 6 is provided with a first step portion 65 on a portion close to the second cavity 63, and the inner diameter of the first step portion 65 is small than the inner diameter of the second cavity 63. A wall portion of the inner housing 6 includes a first outer wall portion 67 and a second outer wall portion 68, and the outer diameter of the first outer wall portion 67 is less than the outer diameter of the second outer wall portion 68, a second step portion 66 is formed at a connection between the first outer wall portion 67 and the second outer wall portion 68. A part of the second spring 4 is mounted on the first outer wall portion 67, and an end of the second spring 4 abuts against the second step portion 66. Such arrangement can improve the stability of the second spring 4 and the inner housing 6, and can also shorten the height of the end cap at the same time, thereby reducing the overall height of the thermostatic valve.

It should be pointed out here that, the inner housing 6 may also be a part of the end cap 2. For example, when the second spring 4 is not provided in the end cap 2, the inner housing 6 and the end cap 2 are integrated, and the end cap 2 does not need to be provided with the end cap accommodating cavity 23, and the circlip 9 is not needed to fix the inner housing 6.

As shown in FIGS. 4 and 6, a part of the shaft sleeve 8 inserts into the second cavity 63, and a sealing ring 91 is also provided in the second cavity 63. The sealing ring 91 is in the compressed state, and an end of the sealing ring 91 abuts against the shaft sleeve 8, so that the shaft sleeve 8 abuts against the first step portion 65.

An end of the valve rod 33 passes through the shaft sleeve 8 and the sealing ring 91 and then inserts into the first cavity 60. A portion, inserting into the first cavity 60, of the valve rod 33 maintains a certain distance from the inner wall corresponding to the first cavity 60, so that the space formed between the outer wall of the valve rod 33 and the inner wall corresponding to the first cavity 60 can be used to accommodate a part of the molten hot melt 7 or the semi-molten hot melt 7.

The inner housing 6 is also provided with the hot melt 7, an end of the hot melt 7 abuts against the bottom wall corresponding to the first cavity 60, and the volume of the molten hot melt 7 is smaller than or equal to the volume of the space formed between the outer wall of the valve rod 33 and the inner wall corresponding to the first cavity 60. Here, the definition of the hot melt 7 is as follows: the hot melt 7 can melt when the temperature is greater than or equal to T1, while when the temperature of the hot melt 7 is lower than T1, the hot melt is in a solid state, such as a solid wax, a fusible alloy and the like. When the temperature of the lubricating oil flowing into the thermostatic valve is in a high temperature state (when the second valve port 141 is closed at this time), the temperature is T2, T1 is lower than or equal to T2. At this time, the hot melt 7 can melt by heat. Since the inner housing 6 is provided with a sealing ring 91, the hot melt 7 in the melting state can still be located in the inner housing 6.

In order to allow the hot melt 7 to melt as soon as possible, the inner housing 6 may be made of a temperature sensing material. The heat of the high-temperature lubricating oil is transferred to the hot melt 7 through the inner housing 6, so that the hot melt 7 is heated and melted.

In the present embodiment, the hot melt 7 is a solid-state solid wax at a normal temperature. Before the lubricating oil is not filled into the thermostatic valve in the system or the high temperature lubricating oil is not flowed into the thermostatic valve in the thermal management system, the solid wax 7 is provided between the bottom wall corresponding to the first cavity 60 and the position-limiting member 69, and one end of the solid wax 7 abuts against the bottom of the first cavity 60, and the other end of the solid wax 7 abuts against an end of the position-limiting member 69. The thickness h2 (that is, a distance between the end of the position-limiting member 69 and the bottom of the first cavity 60 at this time) of the solid wax 7 is less than or equal to the maximum moving distance h1 (a distance between the second core portion 32 and the second valve port portion 14 when the first valve port 211 is closed) of the second valve port portion, and 0≤h1−h2≤0.5 mm. Since the initial elastic deformation force of the second spring 4 is greater than the elastic deformation force generated by the first spring 5 when the second valve port 141 is closed, the second spring 4 and the first spring 5 are both in the compressed state. Since h2 is less than or equal to h1, and the solid wax 7 is provided at this time and the whole thermally movable element 3 is close to the second valve port 141, the second spring 4 is further compressed. At this time, the first core portion 31 moves away from the first valve seat 21, the first valve port 211 is in an open state. The second core portion 32 maintains a small distance from the second valve seat 14, or the second core portion 32 is in contact with the second valve seat 14, the second valve port 141 is opened by a small degree or the second valve port 141 is in a closed state, and an opening of the second valve port 141 is smaller than the opening of the first valve port 211. Therefore, in such arrangement, the first valve port 211 is opened by the solid wax 7, and the second valve port 141 is opened by the small opening or the second valve port 141 is in the closed state. When the lubricating oil flowing into the thermostatic valve is not at a high temperature, the first connecting port passage 111 may also be in communication with the second connecting port passage 121. In this way, when the lubricating oil is filled, it does not need to open the first valve port for filling with the high-temperature lubricating oil since the first valve port 211 is in the open state. When it is used in the system, the process of filling the lubricating oil is relatively simple.

It should be pointed out here that, opening by a small degree refers to that the second valve port 141 has a small opening compared with the opening of the first valve port 211. For example, in the present embodiment, a value of a difference between a distance between the second core portion 32 and the second valve seat 14 in the filling state and the distance between the second core portion 32 and the second valve seat 14 in the first working state ranges from 0 to 0.5 mm. If the opening of the second valve port 141 is too large, a relatively large amount of lubricating oil will directly flow back to the gearbox through the second valve port 141 and the third connecting port passage 133, and only a small amount or no lubricating oil will flow into the heat exchange device through the first valve port 211 and the second connecting port passage 121, causing the effect of filling the lubricating oil to be relatively poor.

In the present embodiment, since the outer diameter of the large-diameter portion 331 is greater than the inner diameter of the protruding portion 311, such arrangement can prevent the first valve port 211 from not being open but allow the valve rod 3 to be squeezed into the body portion 30 under some system requirements, for example, the elastic force of the first spring 5 is too large. By the arrangement, in the filling state, the large-diameter portion 331 abuts against the protruding portion 311, and the valve rod 33 cannot further insert into the body portion 30, so that the first valve port 211 is opened by providing the solid wax 7.

The thermostatic valve in use is described hereinafter, including: a filling state, a first working state and a second working state.

As shown in FIG. 3, in the filling state, the solid wax 7 in the solid state is provided in the first cavity 60, the large-diameter portion 331 abuts against the protruding portion 311, the first valve port 211 is in the open state, and the second valve port 141 is opened by the small degree. In the use of the thermostatic valve, since the first valve port 211 is in the open state, when the thermal management system is filled with the lubricating oil, a part of the lubricating oil may flow into the heat exchange device by passing through the first connecting port passage 111 and the second connecting port passage 121. Such arrangement, on one hand, allows the process of filling the lubricating oil to be relatively simple, and one the other hand, has the function of leakage detection for the heat exchange device and connecting pipelines thereof when filling the lubricating oil, which may dispense the additional process of leakage detection for the heat exchange device. Moreover, if the high-temperature lubricating oil is used for leakage detection, the risk of leakage detection will be relatively large due to the high temperature of the lubricating oil.

Figure 7:
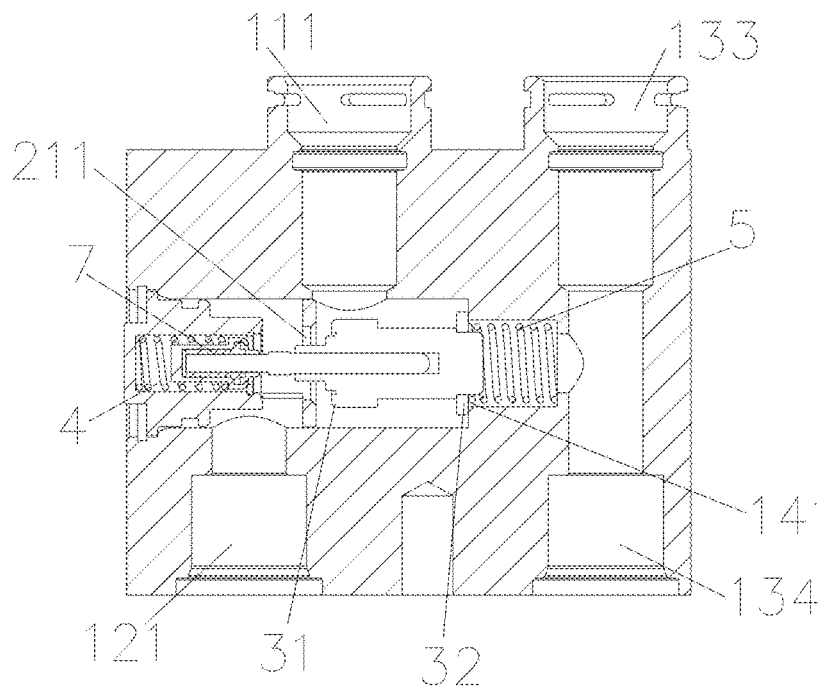
FIG. 7 is a schematic sectional view of the thermostatic valve shown in FIG. 2 taken along line A-A in a high oil temperature state after the melting of a hot melt.

As shown in FIG. 7, in the first working state, the high-temperature lubricating oil flows from the first connecting port passage 111. At this time, due to the high temperature of the lubricating oil, the thermally movable element expands when being heated. The body portion 30 moves towards the second valve port 141, and the second valve port 141 is closed. After the second valve port 141 is closed, the valve rod 33 moves towards the end cap 2 to compress the second spring 4. It should be pointed out here that, if the second valve port 141 is closed in the filling state, when the first working state is firstly experienced after the filling, the body portion 30 does not move, and the valve rod 33 moves towards the end cap 2 to compress the second spring 4.

If the first working state is firstly experienced after the filling, the heat of the lubricating oil is transferred to the solid wax 7 through the inner housing 6 at this time, and the solid wax 7 starts melting when being heated. The hardness of the solid wax 7 decreases in a semi-molten state or in a molten state. Under the action of the spring force, most of the solid wax 7 in the semi-molten state or in the molten state are squeezed into an area between the valve rod 33 and the inner wall corresponding to the first cavity 60 through a gap between the position-limiting member 69 and the inner wall corresponding to the first cavity 60, and a little part of the solid wax 7 in the semi-molten state or in the molten state can exist between the position-limiting member 69 and the bottom wall corresponding to the first cavity 60. As the volume of the molten solid wax 7 is smaller than the volume of an area between the valve rod 33 and the inner wall corresponding to the first cavity 60, the solid wax 7 moves toward the bottom of the first cavity 60 along with the valve rod 33, most of the solid wax 7 will continue to be accommodated in the first cavity 60, specifically flows into the space between the outer wall of valve rod 33 and the inner wall of the first cavity 60, while the amount of the hot melt 7 between the position-limiting member 69 and the bottom wall corresponding to the first cavity 60 is relatively small. Since the inner housing 6 is provided with the sealing ring 91, it can prevent the solid wax 7 from seeping out of the inner housing 6.

It should be pointed out here that, a relatively large amount of hot melt 7 may be retained in the first cavity 60, but the height of the portion corresponding to the hot melt 7 flowing into the second cavity 62 is less than or equal to the maximum moving distance of the second valve port. Compared with this method, the method adopted in the embodiment has a simple structure, and a relatively poor sealing performance and pressure resistance.

Figure 8:
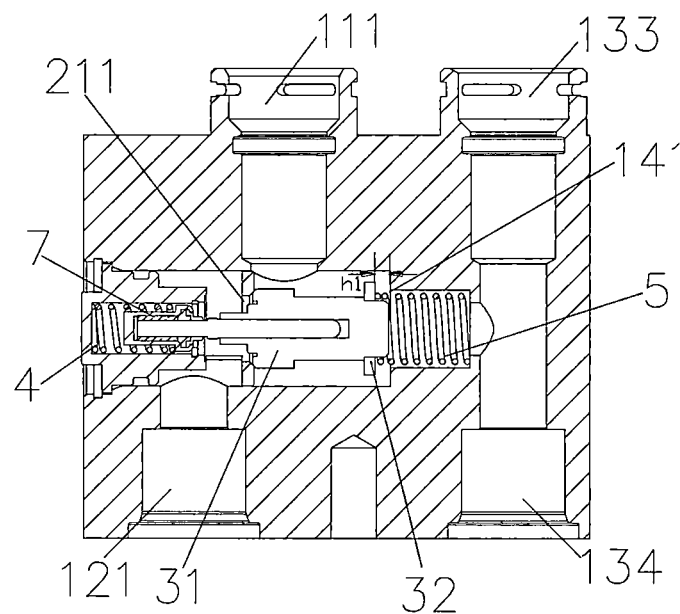
FIG. 8 is a schematic sectional view of the thermostatic valve shown in FIG. 2 taken along line A-A in a normal oil temperature state after the melting of the hot melt.

As shown in FIG. 8, in the second working state, non-high temperature lubricating oil flows from the first connecting port passage 111, the thermally movable element 3 shrinks at this time, the main body portion 30 moves toward the first valve port 211 under the action of the restoring force of the second spring 4 and the first spring 5, and the second valve port 141 is open.

If the first working state has been experienced, most of the solid wax 7 has been accommodated in the area between the valve rod 33 and the inner wall corresponding to the first cavity 60, the distance between the end of the position-limiting member 69 and the bottom of the first cavity 60 decreases, the distance between the end of the valve rod 33 extending into an inner side of the inner housing 6 and the bottom of the first cavity 60 decreases, and the amount of the residual solid wax 7 between the end of the position-limiting member 69 and the bottom of the first cavity 60 is little, which can be ignored. The first core portion 31 abuts against the first valve seat 21 under the elastic force of the first spring 5, and the first valve port 211 is closed. In the thermostatic valve, the first connecting port passage 111 is in communication with the third connecting port passage 133, and the first connecting port passage 111 is not in communication with the second connecting port passage 121.

It can be seen that, in the present embodiment, the position-limiting member 69 is in contact with the hot melt 7, and the hot melt 7 is limited at an initial position. After the hot melt 7 melts, the hot melt 4 may move away from the initial position and enter another space under the push of the valve rod 33. In the present embodiment, another space mainly refers to a gap between the valve rod 33 and the first cavity 61.

Figure 9:
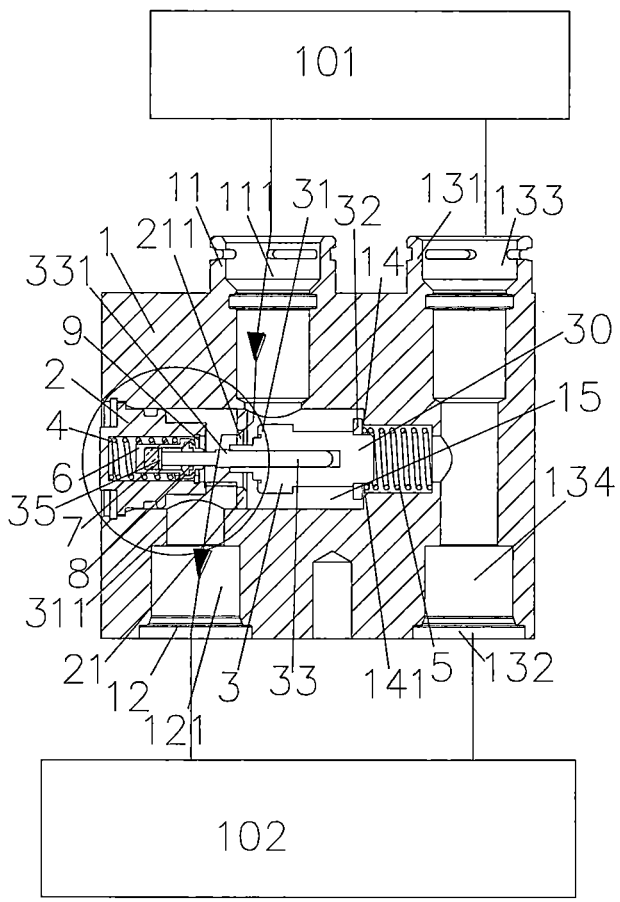
FIG. 9 is a schematic view of an embodiment of a thermal management system according to the present application when the thermostatic valve is in a filling state.

FIG. 9 shows an embodiment of a thermal management system, which comprises the thermostatic valve, a gearbox 101 and a heat exchange device 102. The first connecting port passage 111 of the thermostatic valve is in communication with an outlet of the gearbox 101, and the third connecting port passage 133 is in communication with an inlet of the gearbox 101, the second connecting port passage 121 is in communication with an inlet of the heat exchange device 102, and an outlet of the heat exchange device 102 is in communication with the gearbox 101 through the fourth connecting port passage 134 and the third connecting port passage 133. It should be pointed out here that the outlet of the heat exchange device 102 may also directly be in communication with the inlet of the gearbox 101 through a pipeline, at this time, the fourth connecting port passage 134 may not be provided.

When the thermostatic valve is in the filling state, the outlet of the gearbox is in communication with the inlet of the heat exchange device 102 through the first connecting port passage 111 and the second connecting port passage 121 of the thermostatic valve, and the outlet of the heat exchange device 102 is in communication with the inlet of the gearbox 101 through the fourth connecting port passage 134 and the third connecting port passage 133. FIGS. 10, 11-1 and 11-2 show another embodiment, which is different from the above embodiment. In the present embodiment, the inner housing 6 is provided with a first cavity 61, a second cavity 62 and a third cavity 63. The inner diameter of the first cavity 61 is less than the inner diameter of the second cavity 62, a first step portion 64 is formed at the connection between the inner wall corresponding to the first cavity 61 and the inner wall corresponding to the second cavity 62, and the inner diameter of the second cavity 62 is less than the inner diameter of the third cavity 63. The inner housing 6 is provided with a second step portion 65 at a portion close to the third cavity 63, which is provided on an end of the third cavity 63 in FIG. 11-2, and the inner diameter of the second step portion 65 is less than the inner diameter of the third cavity 63. A wall portion of the inner housing 6 includes a first outer wall portion 67 and a second outer wall portion 68, the outer diameter of the first outer wall portion 67 is less than the outer diameter of the second outer wall portion 68, a third step portion 66 is formed at the connection between the first outer wall portion 67 and the second outer wall portion 68, a part of the second spring 4 is mounted on the first outer wall portion 67, and an end of the second spring 4 abuts against the third step portion 66. Such arrangement may improve the stability of the second spring 4 and the inner housing 6, and may also shorten the height of the end cap at the same time, thereby reducing the overall height of the thermostatic valve.

A supporting member 35 is also provided in the inner housing 6, one end of the supporting member 35 is accommodated in the first cavity 61, and the other end of the supporting member 35 directly or indirectly abuts against the valve rod 33. A portion, locating in the first cavity 61, of the supporting member 35 is in clearance fit with the inner wall corresponding to the first cavity 61. It should be noted here that the supporting member 35 may be integrated with the inner housing 6.

An end portion of the valve rod 33 inserting into the inner side of the inner housing 6 is provided with a hot melt accommodating cavity 332, and a hot melt 7 is accommodated in the hot melt accommodating cavity 332. The end of the valve rod 33 passes through the shaft sleeve 8 and the sealing ring 91 and then inserts into the second cavity 62. A portion, inserting into the second cavity 62, of the valve rod 33 is in clearance fit or is slidably fitted with the inner wall corresponding to the second cavity 62. The end of the supporting member 35 may insert into the hot melt accommodating cavity 332, and the supporting member 35 is in clearance fit or is slidably fitted with the inner wall corresponding to the hot melt accommodating cavity 332. Such arrangement enables the inner wall corresponding to the hot melt accommodating cavity 332 to have a position-limiting and guiding function.

In the present embodiment, the outer diameter of the end portion, inserting into the second cavity 62, of the valve rod 33 is greater than the inner diameter of the inner wall corresponding to the first cavity 61, so that the valve rod 33 cannot insert into the first cavity 61. In the working state, the end of the valve rod 33 can abut against the first step portion 64.

The inner housing 6 is also provided with a hot melt 7, whose volume is smaller than or equal to the volume of the hot melt accommodating cavity 332 after melting. Here, the definition of the hot melt 7 is as follows: the hot melt 7 can melt when the temperature is higher than or equal to T1, while when the temperature of the hot melt 7 is lower than T1, the hot melt is in a solid state, such as a solid wax, a fusible alloy and the like. When the temperature of the lubricating oil flowing into the thermostatic valve is in a high temperature state (when the second valve port 141 is closed at this time), the temperature is T2, T1 is lower than or equal to T2, at this time, the hot melt 7 can melt when being heated. Since the inner housing 6 is provided with the sealing ring 91, the hot melt 7 in the melting state may still be located in the inner housing 6, and the sealing ring 91 is located in the third cavity 63.

In the present embodiment, the hot melt 7 is a solid-state solid wax at a normal temperature. Before the lubricating oil is not filled into the thermostatic valve in the system or the high temperature lubricating oil is not flowed into the thermostatic valve in the thermal management system, the solid wax 7 is provided in the hot melt accommodating cavity 332, and one end of the solid wax 7 abuts against the bottom wall corresponding to the hot melt accommodating cavity 332, and the end of the solid wax 7 abuts against the end of the supporting member 35. A thickness of the solid wax 7 is less than or equal to the maximum stroke h1 (a distance between the second core portion 32 and the second valve port portion 14 when the first valve port 211 is closed) of the second valve port portion, and $0 \leq h1-h2 \leq 0.5$ mm, or in the filling state, a distance between the end of the valve rod 33 inserting into the inner side of the inner housing 6 and the first step portion 64 is less than or equal to the maximum moving distance h1 (the distance between the second core portion 32 and the second valve port portion 14 when the first valve port 211 is closed) of the second valve port portion.

In the present embodiment, at least a part of the end of the supporting member 35 inserts into the hot melt accommodating cavity 332, that is, the thickness of the solid wax 7 is less than the height of the hot melt accommodating cavity 332. Such arrangement can limit the valve rod 33, prevent the valve rod from shifting, and prevent the thermostatic valve from not working normally.

The thermostatic valve in use is described hereinafter, including: a filling state, a first working state and a second working state.

Figure 10:
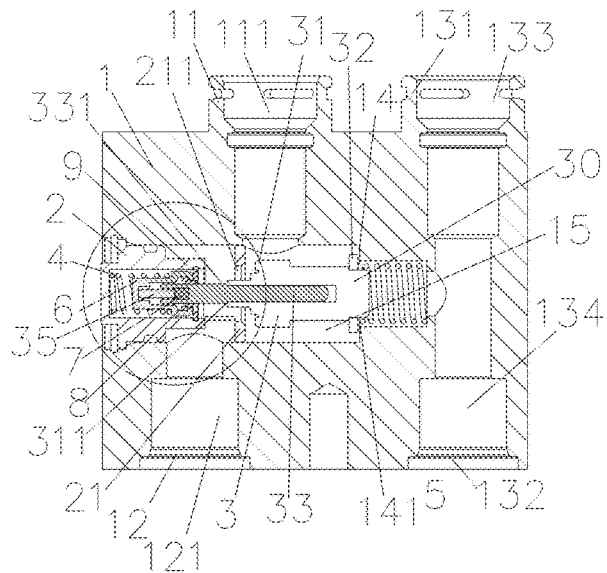
FIG. 10 is a schematic sectional view of a thermostatic valve according to another embodiment of the present application taken along line A-A during filling.
Figures 1, 11:
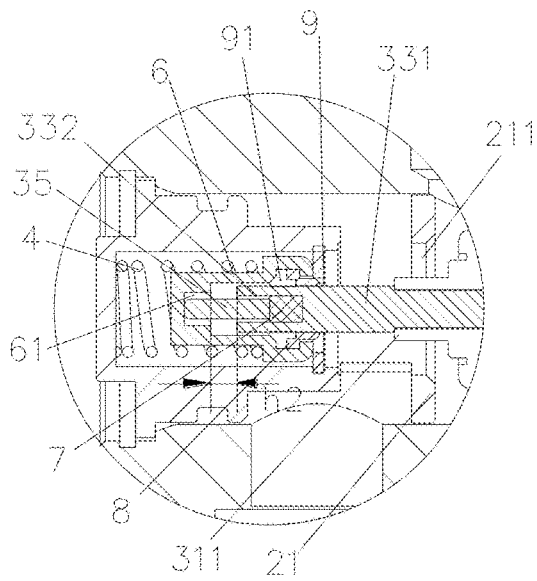
Figures 2, 11:
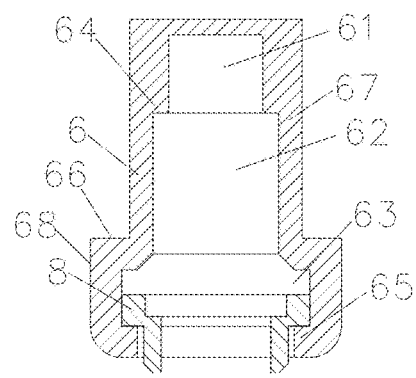

As shown in FIG. 10, in the filling state, the solid wax 7 in the solid state is provided in the hot melt accommodating cavity 332, the large-diameter portion 331 abuts against the protruding portion 311, the end of the valve rod 33 inserting into the inner housing 6 directly or indirectly abuts against the first step portion, and/or the end of the supporting member 35 inserting into the hot melt accommodating cavity 332 directly or indirectly abuts against the bottom wall corresponding to the hot melt accommodating cavity 332, the first valve port 211 is in the open state, and the second valve port 141 is opened by the small degree. In the use of the thermostatic valve, since the first valve port 211 is in the open state, when the thermal management system is filled with the lubricating oil, a part of the lubricating oil may flow into the heat exchange device through the first connecting port passage 111 and the second connecting port passage 121. Such arrangement, on one hand, allows the process of filling the lubricating oil to be relatively simple, and one the other hand, has the function of leakage detection for the heat exchange device and connecting pipelines thereof when the lubricating oil is filled, which may dispense the additional process of leakage detection for the heat exchange device. Moreover, if the high-temperature lubricating oil is used for leakage detection, the risk of leakage detection will be relatively large due to the high temperature of the lubricating oil. In the present embodiment, the end, of the valve rod 33, directly or indirectly abuts against the first step portion. Such arrangement has a simple and compact structure.

In the first working state, the high-temperature lubricating oil flows from the first connecting port passage 111. At this time, due to the high temperature of the high-temperature lubricating oil, the thermally movable element expands when being heated, the body portion 30 moves towards the second valve port 141, the second valve port 141 is closed, and after the second valve port 141 is closed, the valve rod 33 moves towards the end cap 2 to compress the second spring 4. It should be pointed out here that, if the second valve port 141 is closed in the filling state, when the first working state is firstly experienced after the filling, the body portion 30 does not move, and the valve rod 33 moves to the end cap 2 to compress the second spring 4.

If the first working state is firstly experienced after the filling, the heat of the lubricating oil is transferred to the solid wax 7 through the inner housing 6 at this time, and the solid wax 7 starts melting when being heated. The hardness of the solid wax 7 decreases in the semi-molten state or in the molten state. Under the action of the spring force, most of the solid wax 7 in the semi-molten state or in the molten state are squeezed into the first cavity 61, the second cavity 62 and an area between the supporting member 35 and the inner wall corresponding to hot melt accommodating cavity 332, and the distance between the supporting member 35 and the bottom of the hot melt accommodating cavity 332 decreases. After this change, most of the solid wax 7 will continue to be accommodated in the first cavity 61 under the action of the spring force. Since the inner housing 6 is provided with the sealing ring 91, it may prevent the solid wax 7 from seeping out of the inner housing 6.

In the second working state, non-high temperature lubricating oil flows from the first connecting port passage 111, the thermally movable element shrinks at this time, and the main body portion 30 moves toward the first valve port 211 under the action of the restoring force of the second spring 4 and the first spring 5, and the second valve port 141 is open.

If the first working state has been experienced, most of the solid wax 7 have been accommodated in the first cavity 61, the second cavity 62 and the area between the supporting member 35 and the inner wall corresponding to the hot melt accommodating cavity 332, the distance between the end of the valve rod 33 extending into the inner side of the inner housing 6 and the first step portion 64 decreases, the distance between the supporting member 35 and the bottom of the hot melt accommodating cavity 332 decreases, and the residual amount of the solid wax 7 between the end portion, inserting into the inner side of the inner housing 6, of the valve rod 33 and the first step portion 64 is very little, which can be ignored. The first core portion 31 abuts against the first valve seat 21 under the elastic force of the first spring 5, and the first valve port 211 is closed. In the thermostatic valve, the first connecting port passage 111 is in communication with the third connecting port passage 133, and the first connecting port passage 111 is not in communication with the second connecting port passage 121.

It can be seen that, in the present embodiment, the supporting member 35 is in contact with the hot melt 7, and the hot melt 7 is limited at an initial position, that is, in the hot melt accommodating cavity 332. After the hot melt 7 is molten or semi-molten, the hot melt 7 can move away from the initial position and enter another space under the push of the valve rod 33. In the present embodiment, another space mainly refers to a gap between the supporting member 35 and the first cavity 61 and a gap between the supporting member 35 and the second cavity 62.

Other structures and working principles of the present embodiment are similar or approximate to those of the above embodiments, which are not described here anymore.

FIGS. 12, 13-1 and 13-2 show another embodiment, which is different from the above embodiments. In the present embodiment, the inner housing 6 is provided with a cavity which includes a first cavity 61, a second cavity 62 and a third cavity 63 which are in communication with each other. The inner diameter of the first cavity 61 is less than the inner diameter of the second cavity 62, a first step portion 64 is formed at the connection between the inner wall corresponding to the first cavity 61 and the inner wall corresponding to the second cavity 62, and the inner diameter of the second cavity 62 is less than the inner diameter of the third cavity 63. The inner housing 6 is provided with a second step portion 65 at a portion close to the third cavity 63, which is provided on the end of the third cavity 63 in FIG. 13-2, and the inner diameter of the second step portion 65 is less than the inner diameter of the third cavity 63. A wall portion of the inner housing 6 includes a first outer wall portion 67 and a second outer wall portion 68, and the outer diameter of the first outer wall portion 67 is less than the outer diameter of the second outer wall portion 68, a third step portion 66 is formed at the connection between the first outer wall portion 67 and the second outer wall portion 68, a part of the second spring 4 is mounted on the first outer wall portion 67, and an end of the second spring 4 abuts against the third step portion 66. Such arrangement may improve the stability of the second spring 4 and the inner housing 6, and may also shorten the height of the end cap at the same time, thereby reducing the overall height of the thermostatic valve.

In the present embodiment, the hot melt 7 is a solid-state solid wax at a normal temperature. Before the lubricating oil is not filled into the thermostatic valve in the system or the high temperature lubricating oil is not flowed into the thermostatic valve in the thermal management system, the solid wax 7 is provided in the second cavity 62, and the end of the solid wax 7 abuts against the first step portion 64, and another end of the solid wax 7 abuts against the end of the valve rod 33. The thickness h2 (that is, a distance between the end, inserting into the inner side of the inner housing 6, of the valve rod 33 and the first step portion 64 at this time) of the solid wax 7 is less than or equal to the maximum moving distance h1 (a distance between the second core portion 32 and the second valve port portion 14 when the first valve port is closed) of the second valve port portion, and 0≤h1−h2≤0.5 mm. A value of a difference between a distance between the second core portion and the second valve seat in the filling state and the distance between the second core portion and the second valve seat in the first working state ranges from 0 to 0.5 mm.

Here, the definition of the hot melt 7 is as follows: the hot melt 7 can melt when the temperature is higher than or equal to T1, while when the temperature of the hot melt 7 is lower than T1, the hot melt is in a solid state, such as a solid wax, a fusible alloy and the like. When the temperature of the lubricating oil flowing into the thermostatic valve is in a high temperature state (when the second valve port 141 is closed at this time), the temperature is T2, T1 is less than or equal to T2, at this time, the hot melt 7 can melt when being heated. Since the inner housing 6 is provided with the sealing ring 91, the hot melt 7 in the melting state may still be located in the inner housing 6, and the sealing ring 91 is located in the third cavity 63.

The thermostatic valve in use is described hereinafter, including: a filling state, a first working state and a second working state.

Figure 12:
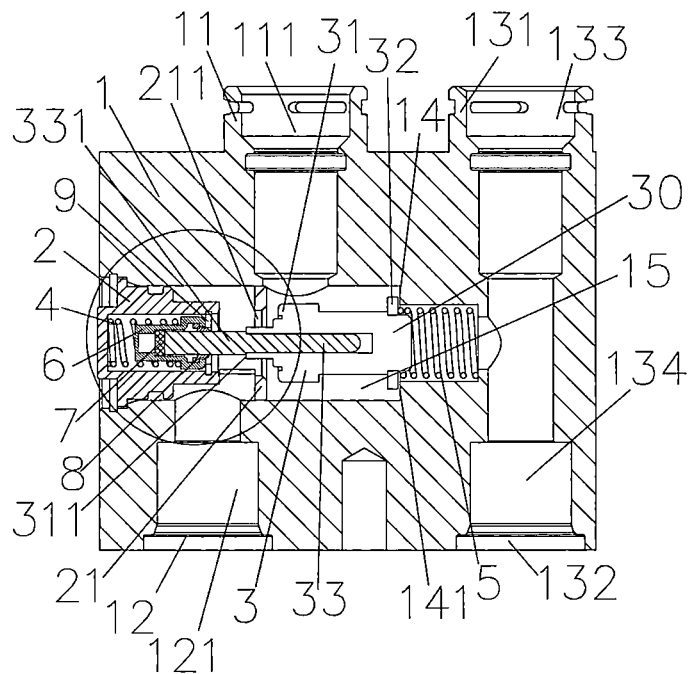
FIG. 12 is a schematic sectional view of a thermostatic valve according to another embodiment of the present application taken along line A-A during filling.
Figures 1, 13:
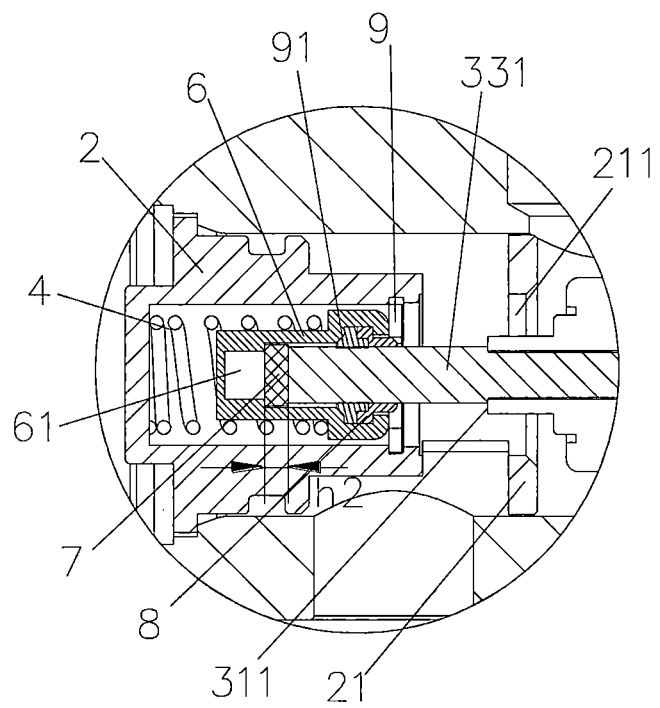
Figures 2, 13:
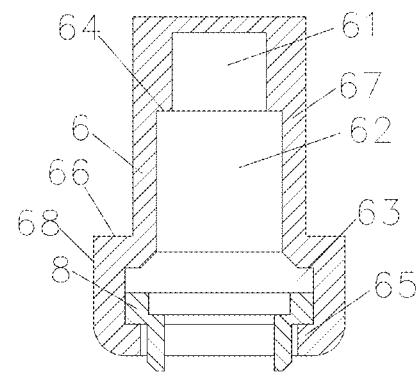

As shown in FIG. 12, in the filling state, the solid wax 7 in the solid state is provided in the second cavity 62, the large-diameter portion 331 abuts against the protruding portion 311, the first valve port 211 is in the open state, and the second valve port 141 is opened by the small degree. In the use of the thermostatic valve, since the first valve port 211 is in the open state, when the thermal management system is filled with the lubricating oil, a part of the lubricating oil can flow into the heat exchange device after passing through the first connecting port passage 111 and the second connecting port passage 121. Such arrangement, on the one hand, allows the process of filling the lubricating oil to be relatively simple, and on the other hand, has the function of leakage detection for the heat exchange device and connecting pipelines thereof when filling the lubricating oil, which may dispense the additional process of leakage detection for the heat exchange device. Moreover, if the high-temperature lubricating oil is used for leakage detection, the risk of leakage detection will be relatively large due to the high temperature of the lubricating oil.

In the first working state, the high-temperature lubricating oil flows from the first connecting port passage 111. At this time, due to the high temperature of the high-temperature lubricating oil, the thermally movable element expands when being heated, the body portion 30 moves towards the second valve port 141, the second valve port 141 is closed, and after the second valve port 141 is closed, the valve rod 33 moves towards the end cap 2 to compress the second spring 4. It should be pointed out here that, if the second valve port 141 is closed in the filling state, when the first working state is firstly experienced after the filling, the body portion 30 does not move, and the valve rod 33 moves towards the end cap 2 to compress the second spring 4.

If the first working state is firstly experienced after the filling, the heat of the lubricating oil is transferred to the solid wax 7 through the inner housing 6 at this time, and the solid wax 7 starts melting due to heat. The hardness of the solid wax 7 decreases in the semi-molten state or in the molten state. Under the action of the spring force, most of the solid wax 7 in the semi-molten state or in the molten state is squeezed into the first cavity 61, and a little part of the solid wax 7 in the semi-molten state or the molten state can exist in the second cavity 62. As the volume of the solid wax 7 after melting is smaller than the volume of the first cavity 61, the outer diameter of the end portion, inserting into the second cavity 62, of the valve rod 33 is greater than the inner diameter of the inner wall corresponding to the first cavity 61, most of the solid wax 7 will continue to be accommodated in the first cavity 61. Since the inner housing 6 is provided with the sealing ring 91, it can prevent the solid wax 7 from seeping out of the inner housing 6.

In the second working state, non-high temperature lubricating oil flows from the first connecting port passage 111, the thermally movable element shrinks at this time, the main body portion 30 moves toward the first valve port 211 under the action of the restoring force of the second spring 4 and the first spring 5, and the second valve port 141 is open.

If the first working state has been experienced, most of the solid wax 7 has been accommodated in the first cavity 61, the distance between the end portion, inserting into the inner side of the inner housing 6, of the valve rod 33 and the first step portion 64 decreases, and the amount of the residual solid wax 7 between the end of valve rod 33 extending into the inner side of the inner housing 6 and the first step portion 64 is very little, which can be ignored. The first core portion 31 abuts against the first valve seat 21 under the elastic force of the first spring 5, and the first valve port 211 is closed. In the thermostatic valve, the first connecting port passage 111 is in communication with the third connecting port passage 133, and the first connecting port passage 111 is not in communication with the second connecting port passage 121.

It can be seen that, in the present embodiment, the first step portion 64 serves as the position-limiting structure to be in contact with the hot melt 7, and limits the hot melt 7 at the initial position together with the valve rod 33. After the hot melt 7 melts or semi-melts, the hot melt 7 can move away from the initial position and enter another space under the push of the valve rod 33. In the present embodiment, another space mainly refers to the first cavity 61, and the gap between the valve rod 33 and the second cavity 62.

Other structures and working principles of the present embodiment are similar or approximate to those of the above embodiments, which are not described here anymore.

FIGS. 14, 15-1 and 15-2 show another embodiment, which is different from the above embodiment. In the present embodiment, the inner housing 6 has a cavity, and the inner housing 6 is also provided with the position-limiting member 69 which protrudes out of the inner wall corresponding to the cavity. The end, inserting into the cavity, of the valve rod 33 and the valve rod 33 is slidably fitted or is in clearance fit with the position-limiting member 69, and the position-limiting member 69 has the position-limiting and guiding function. It should be noted that, the position-limiting member 69 can insert into the bottom wall corresponding to the cavity, and the hot melt 7 hereinafter abuts against the bottom wall corresponding to the cavity, and a part of the hot melt 7 can be limited to the space corresponding to the position-limiting member 69; or the position-limiting member 69 can also maintain a certain distance from the bottom wall corresponding to the cavity, and the hot melt 7 hereinafter abuts against the bottom wall corresponding to the cavity, and a part of the hot melt 7 can be limited to the space corresponding to the position-limiting member 69, or the thickness of the hot melt 7 is less than the distance between the position-limiting member 69 and the bottom wall corresponding to the cavity. The number of the position-limiting member 69 can be one (for example, an annular shape) or multiple (for example, multiple semi annular shapes).

In the present embodiment, the inner housing 69 is provided with a cavity which includes a first cavity 61, a second cavity 62 and a third cavity 63 which are in communication with each other. The position-limiting member 69 is a part of the inner wall corresponding the first cavity 61, and the inner diameter of the first cavity 61 is less than the inner diameter of the second cavity 62, the first step portion 64 is formed at the connection between the inner wall corresponding to the first cavity 61 and the inner wall corresponding to the second cavity 62, and the inner diameter of the second cavity 62 is less than the inner diameter of the third cavity 63. The inner housing 6 is provided with a second step portion 65 at a portion close to the third cavity 63, which is provided on the end of the third cavity 63 in FIG. 15-2, and the inner diameter of the second step portion 65 is less than the inner diameter of the third cavity 63. A wall portion of the inner housing 6 includes a first outer wall portion 67 and a second outer wall portion 68, and the outer diameter of the first outer wall portion 67 is less than the outer diameter of the second outer wall portion 68, a third step portion 66 is formed at the connection between the first outer wall portion 67 and the second outer wall portion 68, a part of the second spring 4 is mounted on the first outer wall portion 67, and an end of the second spring 4 abuts against the third step portion 66. Such arrangement can improve the stability of the second spring 4 and the inner housing 6, and can also shorten the height of the end cap at the same time, thereby reducing the overall height of the thermostatic valve.

The inner housing 6 is also provided with a hot melt 7, an end of the hot melt 7 abuts against the bottom wall corresponding to the first cavity 61, and the volume of the hot melt 7 after melting is smaller than or equal to the volume of the space formed between the outer wall of the valve rod 33 and the inner wall corresponding to the second cavity 62. Here, the definition of the hot melt 7 is as follows: the hot melt 7 can melt when the temperature is higher than or equal to T1, while when the temperature of the hot melt 7 is lower than T1, the hot melt is in a solid state, such as a solid wax, a fusible alloy and the like. When the temperature of the lubricating oil flowing into the thermostatic valve is in a high temperature state (when the second valve port 141 is closed at this time), the temperature is T2, T1 is lower than or equal to T2, at this time, the hot melt 7 can melt when being heated. Since the inner housing 6 is provided with the sealing ring 91, the hot melt 7 in the molten state can still be located in the inner housing 6, and the sealing ring 91 is located in the third cavity 63.

In the present embodiment, the hot melt 7 is a solid-state solid wax at a normal temperature. Before the lubricating oil is not filled into the thermostatic valve in the system or the high temperature lubricating oil is not flowed into the thermostatic valve in the thermal management system, the solid wax 7 is provided in the first cavity 60, and abuts against the bottom wall of the first cavity 61 and the valve rod 33. The thickness of the solid wax 7 is less than or equal to the maximum stroke h1 (a distance between the second core portion 32 and the second valve port portion 14 when the first valve port is closed) of the second valve port portion, and $0 \leq h1-h2 \leq 0.5$ mm, or in the filling state, the distance between the end of the valve rod 33 extending into the inner side of the inner housing 6 and the bottom wall of the first cavity 61 is less than the maximum stroke h1 (a distance between the second core portion 32 and the second valve port portion 14 when the first valve port 211 is closed) of the second valve port portion.

The thermostatic valve in use is described hereinafter, including: a filling state, a first working state and a second working state.

Figure 14:
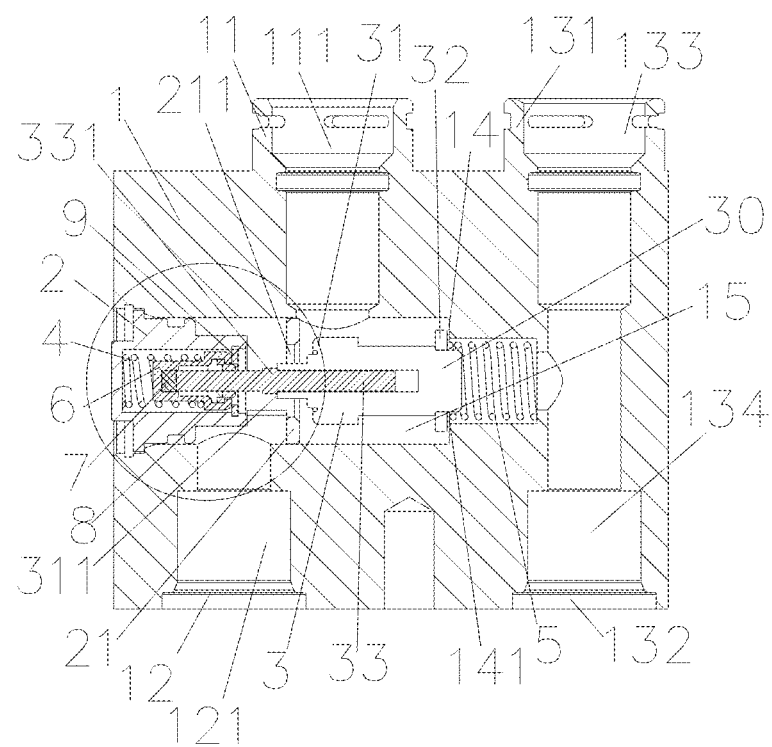
FIG. 14 is a schematic sectional view of a thermostatic valve according to another embodiment of the present application taken along line A-A during filling.
Figures 1, 15:
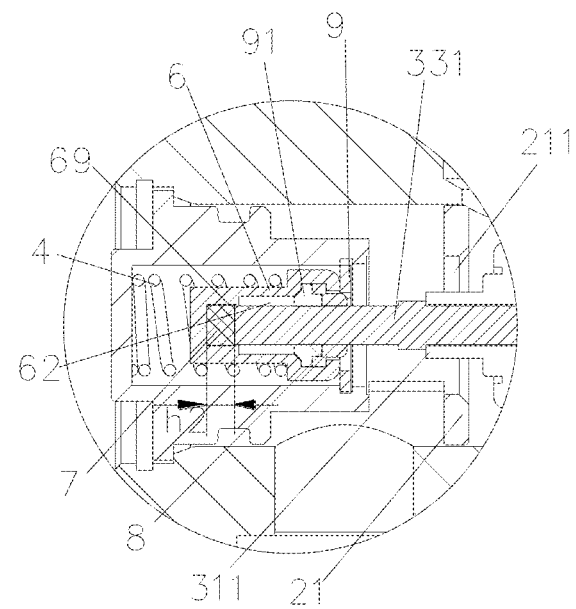
Figures 2, 15:
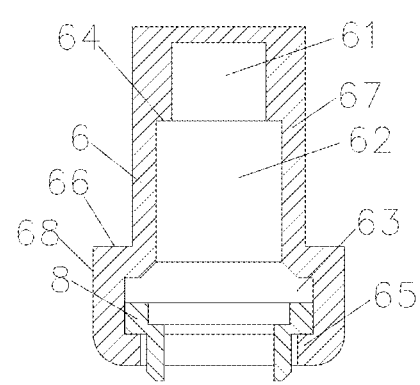

As shown in FIG. 14, in the filling state, the solid wax 7 in the solid state is provided in the first cavity 61, the large-diameter portion 331 abuts against the protruding portion 311, the first valve port 211 is in the open state, and the second valve port 141 is opened by the small degree. In the use of the thermostatic valve, since the first valve port 211 is in the open state, when the thermal management system is filled with the lubricating oil, a part of the lubricating oil can flow into the heat exchange device through the first connecting port passage 111 and the second connecting port passage 121. Such arrangement, on one hand, allows the process of filling the lubricating oil to be relatively simple, and on the other hand has the function of leakage detection for the heat exchange device and connecting pipelines thereof when filling the lubricating oil, which may dispense the additional process of leakage detection for the heat exchange device. Moreover, if the high-temperature lubricating oil is used for leakage detection, the risk of leakage detection will be relatively large due to the high temperature of the lubricating oil.

In the first working state, the high-temperature lubricating oil flows from the first connecting port passage 111. At this time, due to the high temperature of the lubricating oil, the thermally movable element expands when being heated, the body portion 30 moves towards the second valve port 141, the second valve port 141 is closed, and after the second valve port 141 is closed, the valve rod 33 moves towards the end cap 2 to compress the second spring 4. It should be pointed out here that, if the second valve port 141 is closed in the filling state, when the first working state is firstly experienced after the filling, the body portion 30 does not move, and the valve rod 33 moves towards the end cap 2 to compress the second spring 4.

If the first working state is firstly experienced after the filling, at this time, the heat of the lubricating oil is transferred to the solid wax 7 through the inner housing 6, and the solid wax 7 starts melting due to heat. The hardness of the solid wax 7 decreases in the semi-molten state or in the molten state. Under the action of the spring force, most of the solid wax 7 in the semi-molten state or in the molten state is squeezed into the second cavity 62, and a little part of the solid wax 7 in the semi-molten state or the molten state can exist in the second cavity 62. As the volume of the solid wax 7 after melting is smaller than the volume of the space between the valve rod 33 and the inner wall corresponding to the second cavity 62, the solid wax 7 moves toward the bottom of the first cavity 61 along with the valve rod 33, most of the solid wax 7 will continue to be accommodated in the first cavity 61, while the amount of the hot melt 7 retained in the first cavity 61 is relatively small. Since the inner housing 6 is provided with the sealing ring 91, it can prevent the solid wax 7 from seeping out of the inner housing 6.

It should be pointed out here that, more hot melt 7 can be retained in the first cavity 61, but the height of the corresponding portion of the hot melt 7 flowing into the second cavity 62 is less than or equal to the maximum moving distance of the second valve port. Compared with the above method, the method adopted in the present embodiment has a simple structure, and a relatively low sealing performance and pressure resistance.

In the second working state, non-high temperature lubricating oil flows from the first port passage 111, the thermally movable element shrinks at this time, the main body portion 30 moves toward the first valve port 211 under the action of the restoring force of the second spring 4 and the first spring 5, and the second valve port 141 is open.

If the first working state has been experienced, most of the solid wax 7 has been accommodated in the second cavity 62, the distance between the end of the valve rod 33 extending into the inner side of the inner housing 6 and the bottom of the first cavity 61 decreases, and the amount of the residual solid wax 7 between the end of the valve rod 33 extending into the inner side of the inner housing 6 and the bottom of the first cavity 61 is very little, which can be ignored. The first core portion 31 abuts against the first valve seat 21 under the elastic force of the first spring 5, and the first valve port 211 is closed. In the thermostatic valve, the first connecting port passage 111 is in communication with the third connecting port passage 133, and the first connecting port passage 111 is not in communication with the second connecting port passage 121.

It can be seen that, in the present embodiment, the first step portion 64 serves as the position-limiting structure to be in contact with the hot melt 7, and limits the hot melt 7 at the initial position together with the valve rod 33 in a radial direction. After the hot melt 7 melts or semi-melts, the hot melt 7 can move away from the initial position and enter another space under the push of the valve rod 33. In the present embodiment, another space mainly refers to a gap between the inner wall of the second cavity 62 and the valve rod 33.

Other structures and working principles of the present embodiment are similar or approximate to those of the above embodiments, which are not described here anymore.

It should be noted that, in all the above embodiments, by providing the hot melt in the first cavity, the valve rod maintains a certain distance from the bottom of the first cavity. In the filling state, the hot melt has not been melted, the first valve port can be open, and the hot melt can move away from the initial position after melting. The valve rod and the bottom of the first cavity are no longer limited by the hot melt and can be normal in the first working state or the second working state.

The above are merely specific embodiments of the present application and are not intended to limit the present application in any formal. Although the present application has been disclosed in the preferred embodiments, the embodiments are not intended to limit the present application. Many variations and modifications may be made to the technical solution of the present application, or equivalent embodiments may be modified from the technical solution of the present application by those skilled in the art based on the methods and the technical contents disclosed above without departing from the scope of the present application. Therefore, all contents that do not depart from the technical solution of the present application, and any simple alteration, equivalent variation and modification made to the embodiments based on the technical substance of the present application should all fall in the scope of protection of the present application.

The invention claimed is:

1. A thermostatic valve, comprising:
a main valve body,
an end cap,
a thermally movable element,
a first spring, and
a position-limiting structure,
wherein the main valve body is provided with a first connecting port portion, a second connecting port portion and a third connecting port portion, the first connecting port portion is provided with a first connecting port passage, the second connecting port portion is provided with a second connecting port passage, and the third connecting port portion is provided with a third connecting port passage, one end of the thermally movable element directly or indirectly abuts against the end cap, and the other end of the thermally movable element directly or indirectly abuts against the first spring, the first spring is in a compressed state,
wherein the thermostatic valve is further provided with a first valve seat and a second valve seat, the first valve seat is provided with a first valve port, the second valve seat is provided with a second valve port, the first valve port is located between the first connecting port passage and the second connecting port passage, the second valve port is located between the first connecting port passage and the third connecting port passage,
wherein the thermostatic valve has a first cavity which is located in the end cap, the thermally movable element comprises a valve rod, one end of the valve rod inserts into the end cap, and the first cavity is provided with a hot melt, which is located in an area between the valve rod and a bottom wall corresponding to the first cavity;
wherein the thermostatic valve comprises a filling state and a first working state, in the filling state, the end of the valve rod maintains a certain distance from the bottom wall corresponding to the first cavity through the hot melt, the first valve port is open, the second valve port is closed, or open by a small degree; in the first working state, the first valve port is open, the second valve port is closed; a distance between the end of the valve rod and a bottom corresponding to the first cavity in the first working state is less than the distance between the end of the valve rod and the bottom corresponding to the first cavity in the filling state,
wherein the position-limiting structure limits the hot melt to be located at an initial position, the hot melt is configured to move from the initial position after melting due to heat, which allows the distance between the end of the valve rod and the bottom corresponding to the first cavity in the first working state to be less than the distance between the end of the valve rod and the bottom corresponding to the first cavity in the filling state,
the thermostatic valve further comprises a second cavity, the first cavity and the second cavity are located in the end cap, the first cavity is relatively away from the first valve port, the second cavity is relatively toward the first valve port, an inner diameter of the first cavity is less than an inner diameter of the second cavity, a first step portion is formed at a connection between an inner wall corresponding to the first cavity and an inner wall corresponding to the second cavity;
wherein the end portion, inserting into the end cap, of the valve rod is provided with a hot melt accommodating cavity, the position-limiting structure is a supporting member, the hot melt is provided between the supporting member and a bottom of the hot melt accommodating cavity; in the filling state, the first valve port is open, the second valve port is closed, or open by a small degree, the hot melt is located between an end of the supporting member and a bottom wall corresponding to the hot melt accommodating cavity, an end portion of the supporting member abuts against the hot melt, the hot melt abuts against the bottom wall corresponding to the hot melt accommodating cavity; in the first working state, the first valve port is open, the second valve port is closed; a distance between the end of the valve rod and the first step portion in the first working state is less than the distance between the end of the valve rod and the first step portion in the filling state, an outer wall of the supporting member is in clearance fit with an inner wall corresponding to the hot melt accommodating cavity.

2. The thermostatic valve according to claim 1, wherein, the thermostatic valve is further provided with a position-limiting portion, the position-limiting structure comprises the position-limiting portion, the position-limiting portion protrudes out of the inner wall corresponding to the first cavity, the end of the valve rod inserts into the end cap, an end portion, inserting into the end cap, of the valve rod is slidably fitted or in clearance fit with the position-limiting portion;
in the filling state, the hot melt is located between the end portion of the valve rod and the bottom of the first cavity, the end portion of the valve rod abuts against the hot melt, and the hot melt abuts against the bottom of the first cavity, the first valve port is open, the second valve port is closed, or open by a small degree; in the first working state, the first valve port is open, the second valve port is closed, a distance between the end portion of the valve rod and the bottom of the first cavity in the first working state is less than the distance between the end of the valve rod and the bottom of the first cavity in the filling state.

3. The thermostatic valve according to claim 1, wherein, the thermally movable element comprises a first core portion corresponding to the first valve seat, and a second core portion corresponding to the second valve seat, when the first core potion abuts against the first valve seat, the first valve port is closed, when the second core portion abuts against the second valve seat, the second valve port is closed;
the thermostatic valve further has a second working state, in the second working state, a part of the hot melt is located in an area between the valve rod and the inner wall corresponding to the first cavity, the distance between the end of the position-limiting member and the bottom of the first cavity in the second working state is less than the distance between the end of the position-limiting member and the bottom of the first cavity in the filling state, the first valve port is closed, and the second valve port is open.

4. The thermostatic valve according to claim 3, wherein, a distance between the second valve seat and the second core portion in the second working state is greater than or equal to a thickness of the hot melt in the filling state, a value of a difference between the distance between the second valve seat and the second core portion in the second working state and the thickness of the hot melt in the filling state ranges from 0 to 0.5 mm;
  a value of a difference between the distance between the second core portion and the second valve seat in the filling state and the distance between the second core portion and the second valve seat in the first working state ranges from 0 to 0.5 mm.

5. The thermostatic valve according to claim 4, wherein, the thermostatic valve further comprises a second spring and an inner housing, the end cap comprises a main body portion, the main body portion is provided with an end cap accommodating cavity, the second spring and the inner housing are provided in the end cap accommodating cavity, the first cavity and the second cavity are provided in the inner housing, the first step portion is a part of the inner housing, the inner housing is limited in the end cap accommodating cavity by a circlip, one end of the second spring abuts against a bottom wall corresponding to the end cap accommodating cavity, and the other end of the second spring abuts against the inner housing, the second spring is in the compressed state, an initial elastic deformation force of the second spring is greater or equal to an elastic deformation force generated by the first spring when the second valve port is closed.

6. A thermal management system, comprising a thermostatic valve, a gearbox and a heat exchange device, wherein, the thermostatic valve is the thermostatic valve according to claim 3, the first connecting port passage of the thermostatic valve is in communication with an outlet of the gearbox, the third connecting port passage is in communication with an inlet of the gearbox, the second connecting port passage is in communication with an inlet of the heat exchange device, an outlet of the heat exchange device is in communication with the inlet of the gearbox,
  when the thermostatic valve is in the filling state, the outlet of the gearbox is in communication with the inlet of the heat exchange device through the first connecting port passage and the second connecting port passage of the thermostatic valve, the outlet of the heat exchange device is in communication with the inlet of the gearbox;
  when the thermostatic valve is in the first working state, the outlet of the gearbox is in communication with the inlet of the heat exchange device through the first connecting port passage and the second connecting port passage of the thermostatic valve, the outlet of the heat exchange device is in communication with the inlet of the gearbox;
  when the thermostatic valve is in the second working state, the outlet of the gearbox is in communication with the inlet of the gearbox through the first connecting port passage and the third connecting port passage of the thermostatic valve, the inlet of the heat exchange device is not in communication with the first connecting port passage of the thermostatic valve.

7. The thermostatic valve according to claim 3, wherein, the thermostatic valve further comprises a second spring and an inner housing, the end cap comprises a main body portion, the main body portion is provided with an end cap accommodating cavity, the second spring and the inner housing are provided in the end cap accommodating cavity, the first cavity and the second cavity are provided in the inner housing, the first step portion is a part of the inner housing, the inner housing is limited in the end cap accommodating cavity by a circlip, one end of the second spring abuts against a bottom wall corresponding to the end cap accommodating cavity, and the other end of the second spring abuts against the inner housing, the second spring is in the compressed state, an initial elastic deformation force of the second spring is greater or equal to an elastic deformation force generated by the first spring when the second valve port is closed.

8. The thermostatic valve according to claim 1, wherein, the thermostatic valve further comprises a second spring and an inner housing, the end cap comprises a main body portion, the main body portion is provided with an end cap accommodating cavity, the second spring and the inner housing are provided in the end cap accommodating cavity, the first cavity is provided in the inner housing, the inner housing is limited in the end cap accommodating cavity by a circlip, one end of the second spring abuts against a bottom wall corresponding to the end cap accommodating cavity, and the other end of the second spring abuts against the inner housing, the second spring is in the compressed state, an initial elastic deformation force of the second spring is greater or equal to an elastic deformation force generated by the first spring when the second valve port is closed.

9. A thermal management system, comprising a thermostatic valve, a gearbox and a heat exchange device, wherein, the thermostatic valve is the thermostatic valve according to claim 1, the first connecting port passage of the thermostatic valve is in communication with an outlet of the gearbox, the third connecting port passage is in communication with an inlet of the gearbox, the second connecting port passage is in communication with an inlet of the heat exchange device, an outlet of the heat exchange device is in communication with the inlet of the gearbox,
  when the thermostatic valve is in the filling state, the outlet of the gearbox is in communication with the inlet of the heat exchange device through the first connecting port passage and the second connecting port passage of the thermostatic valve, the outlet of the heat exchange device is in communication with the inlet of the gearbox;
  when the thermostatic valve is in the first working state, the outlet of the gearbox is in communication with the inlet of the heat exchange device through the first connecting port passage and the second connecting port passage of the thermostatic valve, the outlet of the heat exchange device is in communication with the inlet of the gearbox.

10. A thermostatic valve, comprising:
  a main valve body,
  an end cap,
  a thermally movable element,
  a first spring, and
  a position-limiting structure,
  wherein the main valve body is provided with a first connecting port portion, a second connecting port portion and a third connecting port portion, the first connecting port portion is provided with a first connecting port passage, the second connecting port portion is provided with a second connecting port passage, and the third connecting port portion is provided with a third connecting port passage, one end of the thermally movable element directly or indirectly abuts against the end cap, and the other end of the thermally movable element directly or indirectly abuts against the first spring, the first spring is in a compressed state, wherein the thermostatic valve is further provided with a first valve seat and a second valve seat, the first valve seat is provided with a first valve port, the second valve seat is provided with a second valve port, the first valve port is located between the first connecting port passage and the second connecting port passage, the second valve port is located between the first connecting port passage and the third connecting port passage, wherein the thermostatic valve has a first cavity which is located in the end cap, the thermally movable element comprises a valve rod, one end of the valve rod inserts into the end cap, and the first cavity is provided with a hot melt, which is located in an area between the valve rod and a bottom wall corresponding to the first cavity;

wherein the thermostatic valve comprises a filling state and a first working state, in the filling state, the end of the valve rod maintains a certain distance from the bottom wall corresponding to the first cavity through the hot melt, the first valve port is open, the second valve port is closed, or open by a small degree; in the first working state, the first valve port is open, the second valve port is closed; a distance between the end of the valve rod and a bottom corresponding to the first cavity in the first working state is less than the distance between the end of the valve rod and the bottom corresponding to the first cavity in the filling state, wherein the position-limiting structure limits the hot melt to be located at an initial position, the hot melt is configured to move from the initial position after melting due to heat, which allows the distance between the end of the valve rod and the bottom corresponding to the first cavity in the first working state to be less than the distance between the end of the valve rod and the bottom corresponding to the first cavity in the filling state, wherein, the thermostatic valve is further provided with a second cavity, the first cavity and the second cavity are located in the end cap, an inner diameter of the first cavity is less than an inner diameter of the second cavity, a first step portion is formed at a connection between an inner wall corresponding to the first cavity and an inner wall corresponding to the second cavity, the position-limiting structure comprises the first step portion, and the end of the valve rod inserts into the second cavity, an outer diameter of an end portion, inserting into the second cavity, of the valve rod is greater than an inner diameter of the inner wall corresponding to the first cavity, the hot melt is provided in the second cavity;

in the filling state, the hot melt is located between the end portion of the valve rod and the first step portion, the end portion of the valve rod abuts against the hot melt, the hot melt abuts against the first step portion, the first valve port is open, the second valve port is closed or open by a small degree; in the first working state, a part of the hot melt is located in the first cavity, a distance between the end of the valve rod and the first step portion in the first working state is less than the distance between the end of the valve rod and the first step portion in the filling state, the first valve port is open, the second valve port is closed.

11. The thermostatic valve according to claim 10, wherein, the thermally movable element comprises a first core portion corresponding to the first valve seat, and a second core portion corresponding to the second valve seat, when the first core potion abuts against the first valve seat, the first valve port is closed, when the second core portion abuts against the second valve seat, the second valve port is closed;

the thermostatic valve further has a second working state, in the second working state, a part of the hot melt is located in an area between the valve rod and the inner wall corresponding to the first cavity, the distance between the end of the position-limiting member and the bottom of the first cavity in the second working state is less than the distance between the end of the position-limiting member and the bottom of the first cavity in the filling state, the first valve port is closed, and the second valve port is open.

12. The thermostatic valve according to claim 10, wherein, the thermostatic valve further comprises a second spring and an inner housing, the end cap comprises a main body portion, the main body portion is provided with an end cap accommodating cavity, the second spring and the inner housing are provided in the end cap accommodating cavity, the first cavity is provided in the inner housing, the inner housing is limited in the end cap accommodating cavity by a circlip, one end of the second spring abuts against a bottom wall corresponding to the end cap accommodating cavity, and the other end of the second spring abuts against the inner housing, the second spring is in the compressed state, an initial elastic deformation force of the second spring is greater or equal to an elastic deformation force generated by the first spring when the second valve port is closed.

13. A thermal management system, comprising a thermostatic valve, a gearbox and a heat exchange device, wherein, the thermostatic valve is the thermostatic valve according to claim 10, the first connecting port passage of the thermostatic valve is in communication with an outlet of the gearbox, the third connecting port passage is in communication with an inlet of the gearbox, the second connecting port passage is in communication with an inlet of the heat exchange device, an outlet of the heat exchange device is in communication with the inlet of the gearbox, when the thermostatic valve is in the filling state, the outlet of the gearbox is in communication with the inlet of the heat exchange device through the first connecting port passage and the second connecting port passage of the thermostatic valve, the outlet of the heat exchange device is in communication with the inlet of the gearbox;

when the thermostatic valve is in the first working state, the outlet of the gearbox is in communication with the inlet of the heat exchange device through the first connecting port passage and the second connecting port passage of the thermostatic valve, the outlet of the heat exchange device is in communication with the inlet of the gearbox.

14. A thermostatic valve, comprising:
a main valve body,
an end cap,
a thermally movable element,
a first spring, and
a position-limiting structure,
wherein the main valve body is provided with a first connecting port portion, a second connecting port portion and a third connecting port portion, the first connecting port portion is provided with a first connecting port passage, the second connecting port portion is provided with a second connecting port passage, and the third connecting port portion is provided with a third connecting port passage, one end of the thermally movable element directly or indirectly abuts against the end cap, and the other end of the thermally movable element directly or indirectly abuts against the first spring, the first spring is in a compressed state, wherein the thermostatic valve is further provided with a first valve seat and a second valve seat, the first valve seat is provided with a first valve port, the second valve seat is provided with a second valve port, the first valve port is located between the first connecting port passage and the second connecting port passage, the second valve port is located between the first connecting port passage and the third connecting port passage, wherein the thermostatic valve has a first cavity which is located in the end cap, the thermally movable element comprises a valve rod, one end of the valve rod inserts into the end cap, and the first cavity is provided with a hot melt, which is located in an area between the valve rod and a bottom wall corresponding to the first cavity;

wherein the thermostatic valve comprises a filling state and a first working state, in the filling state, the end of the valve rod maintains a certain distance from the bottom wall corresponding to the first cavity through the hot melt, the first valve port is open, the second valve port is closed, or open by a small degree; in the first working state, the first valve port is open, the second valve port is closed; a distance between the end of the valve rod and a bottom corresponding to the first cavity in the first working state is less than the distance between the end of the valve rod and the bottom corresponding to the first cavity in the filling state, wherein the position-limiting structure limits the hot melt to be located at an initial position, the hot melt is configured to move from the initial position after melting due to heat, which allows the distance between the end of the valve rod and the bottom corresponding to the first cavity in the first working state to be less than the distance between the end of the valve rod and the bottom corresponding to the first cavity in the filling state, wherein, the position-limiting structure is a position-limiting member, the position-limiting member is in clearance fit or is slidably fitted with an inner wall corresponding to the first cavity, an end portion of the valve rod inserting into the end cap abuts against, is fixed to, or is integrated with the position-limiting member, the inner wall corresponding to the first cavity maintains a certain distance from the inner wall corresponding to the valve rod, the first cavity is provided with the hot melt;

in the filling state, the hot melt is located between an end portion of the position-limiting member and the bottom wall corresponding to the first cavity, the end portion of the position-limiting member abuts against the hot melt, and the hot melt abuts against the bottom wall corresponding to the first cavity, the first valve port is open, the second valve port is closed, or open by a small opening; in the first working state, the first valve port is open, the second valve port is closed; a distance between the end portion of the position-limiting member and the bottom corresponding to the first cavity in the first working state is less than the distance between the end portion of the position-limiting member and the bottom corresponding to the first cavity in the filling state, wherein, the thermostatic valve further comprises a second cavity which is located in the end cap, the end cap is further provided with a shaft sleeve and a first step portion, an inner diameter of the first step portion is less than an inner diameter of the second cavity, the second cavity is provided with a sealing ring, the sealing ring is in a compressed state, an end of the sealing ring abuts against the shaft sleeve, the shaft sleeve abuts against the first step portion; the thermally movable element comprises a first core portion and a body portion, the first core portion corresponds to the first valve seat, when the first core portion abuts against the first valve seat, the first valve port is closed, the end of the valve rod passes through the first core portion and extends out of the body portion and the first core portion, the valve rod comprises a large-diameter portion, an outer diameter of the large-diameter portion is greater than an inner diameter of the first core portion, the large-diameter portion is located outside the body portion and first core portion, the thermally movable element further comprises a protruding portion, the protruding portion is provided at a side of the first core portion toward the end cap, the valve rod passes through the protruding portion, an outer diameter of the protruding portion is less than the inner diameter of the first valve port, the protruding portion inserts into the first valve seat, the first valve port is formed between an inner wall of a portion corresponding to the first valve port of the first valve seat and the outer wall of the protruding portion, the outer diameter of the large-diameter portion is greater than the inner diameter of the protruding portion, when the thermostatic valve is in the filling state, the large-diameter abuts against the protruding portion.

15. The thermostatic valve according to claim 14, wherein, the thermostatic valve further comprises a second spring and an inner housing, the end cap comprises a main body portion, the main body portion is provided with an end cap accommodating cavity, the second spring and the inner housing are provided in the end cap accommodating cavity, the first cavity and the second cavity are provided in the inner housing, the first step portion is a part of the inner housing, the inner housing is limited in the end cap accommodating cavity by a circlip, one end of the second spring abuts against a bottom wall corresponding to the end cap accommodating cavity, and the other end of the second spring abuts against the inner housing, the second spring is in the compressed state, an initial elastic deformation force of the second spring is greater or equal to an elastic deformation force generated by the first spring when the second valve port is closed.

16. The thermostatic valve according to claim 15, wherein, an wall portion of the inner housing comprises a first outer wall portion and a second outer wall portion, an outer diameter of the first outer wall portion is less than an outer diameter of the second outer wall portion, a second step portion is formed at a connection between the first outer wall portion and the second outer wall portion, a part of the second spring is mounted on the first outer wall portion, and the end of the second spring abuts against the second step portion; the thermostatic valve comprises a fourth connecting port portion, the fourth connecting port portion is provided with a fourth connecting port passage, the fourth connecting port passage is in communication with the third connecting port passage, the first valve seat and the end cap are an integral structure, at least a column portion is provided between the first valve seat and the main body portion, one end of the column portion is connected to the first valve seat, and the other end of the column portion is connected to the main body portion, an outer wall surface of a connection between the main body portion and the column portion is the same as the outer wall surface of the column portion, the second valve seat and the main valve body are an integral structure, the main valve body is provided with a valve body accommodating cavity, the thermally movable element is arranged in the valve body accommodating cavity, the first valve seat is in interference fit, clearance fit or transition fit with the inner wall corresponding to the valve body accommodating cavity;

the hot melt is a solid wax or a low-melting alloy, and the inner housing is made of a temperature sensing material.

17. A thermal management system, comprising a thermostatic valve, a gearbox and a heat exchange device, wherein, the thermostatic valve is the thermostatic valve according to claim 14, the first connecting port passage of the thermostatic valve is in communication with an outlet of the gearbox, the third connecting port passage is in communication with an inlet of the gearbox, the second connecting port passage is in communication with an inlet of the heat exchange device, an outlet of the heat exchange device is in communication with the inlet of the gearbox, when the thermostatic valve is in the filling state, the outlet of the gearbox is in communication with the inlet of the heat exchange device through the first connecting port passage and the second connecting port passage of the thermostatic valve, the outlet of the heat exchange device is in communication with the inlet of the gearbox;

when the thermostatic valve is in the first working state, the outlet of the gearbox is in communication with the inlet of the heat exchange device through the first connecting port passage and the second connecting port passage of the thermostatic valve, the outlet of the heat exchange device is in communication with the inlet of the gearbox;

when the thermostatic valve is in the second working state, the outlet of the gearbox is in communication with the inlet of the gearbox through the first connecting port passage and the third connecting port passage of the thermostatic valve, the inlet of the heat exchange device is not in communication with the first connecting port passage of the thermostatic valve.

* * * * *